(12) United States Patent
Rajchel et al.

(10) Patent No.: US 6,496,931 B1
(45) Date of Patent: Dec. 17, 2002

(54) ANONYMOUS WEB SITE USER INFORMATION COMMUNICATION METHOD

(75) Inventors: Suzanne Kennedy Rajchel, Wheaton, IL (US); Michael G. Ressl, Western Springs, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/224,625

(22) Filed: Dec. 31, 1998

(51) Int. Cl.[7] .................................................. G06F 1/24
(52) U.S. Cl. ......................... 713/168; 713/170; 713/182
(58) Field of Search ............................... 713/168, 170, 713/182, 193, 200, 201

(56) References Cited

U.S. PATENT DOCUMENTS

| | | | |
|---|---|---|---|
| 5,999,971 A | * 12/1999 | Buckland | 709/203 |
| 6,275,934 B1 | * 8/2001 | Novicov et al. | 713/168 |
| 6,286,098 B1 | * 9/2001 | Wenig et al. | 713/151 |
| 6,289,318 B1 | * 9/2001 | Barber | 705/14 |

FOREIGN PATENT DOCUMENTS

EP       0 855 659 A      7/1998

OTHER PUBLICATIONS

Gabber et al.: "How to Make Personalized Web Browsing Simple, Secure, and Anonymous" Financial Cryptography. International Conference, Feb. 24, 1997 XP002059819.

* cited by examiner

Primary Examiner—Thomas R. Peeso
(74) Attorney, Agent, or Firm—Grossman, Patti & Brill

(57) ABSTRACT

A method of anonymously providing user information while browsing internet web sites by inputting a data information record into storage, dynamically generating a user alias, linking the user alias with the user data record to form a user infotmation record (UIR) and then transmitting the anonymous user information record automatically or in response to user commands. This alias identification is transmitted to a remote internet operating computer of a web site that receives the information inputted for collecting information, such as statistical or demographic information. Once the combined UIR has been formed, a communication protocol of the invention allows the user to deliver the UIR to any web site that is accessed. The protocol of the invention also allows the web site operator to read the UIR and aggregate any information it desires about the user. However, as noted, the web site can only gain access to the user's alias identification in combination with the user data. In this way the web site is enabled to collect general demographic information about its user base while being isolated from the true identity of the user. With such privacy the quality of the demographic information can be improved and the statistical reliability is improved by detection of repeat hits by the same user.

25 Claims, 3 Drawing Sheets

ANONYMOUS WEB SITE USER INFORMATION COMMUNICATION METHOD

BACKGROUND OF THE INVENTION

The invention generally relates to communicating web site user information through the internet and, more particularly, to a method of communicating such web site user information to a web site server while shielding the true identity of the user from the web site server.

A common problem facing users of the world wide internet is the difficulty of maintaining user privacy. An internet user generally wishes to browse the internet and visit various web sites without being tracked or monitored. On the other hand, web site operators or web page host providers need information about the internet users who visits its sites. Web site operators collect information that is useful in compiling demographic information about the users in general. Web site operators need this information to track the number of visitors to a web site, make educated estimates to price advertising associated with the web site, and to collect other information about the internet users. In this manner, a web site operator can compile "Nielsen" type data for potential advertisers and other interested parties. To this end, demographic information is quantified and the web site operator or advertiser can determine the efficacy of the advertising money spent.

While an internet user may be willing to provide user information such as age, income range, job description, etc., many are unwilling to do so in association with their actual identification. Aside from the collected information possibly being used as a source of annoying sales calls or junk email and the like, provision of actual identification in association with the user information potentially diminishes the personal security of the user.

One known method of collecting internet user information uses an open profiling standard (OPS) protocol. Pursuant to the OPS protocol, after the internet user accesses a particular web site, the web site automatically requests that the user input the information requested. Once the user information is collected, such as a personal profile, the information is saved in a file on the computer of the user or on a web-based server. This information includes, but is not limited to, fields for providing name, company, address, telephone number, email address, facsimile number, age, race, income level, marriage status, home owner status, employment status, shopping preferences, entertainment preferences, hobbies, medical information, and the like.

The internet user inputs information into those fields that the internet user wishes to disclose. When the internet user revisits a particular site, the stored OPS profile is sent, with the consent of the user, to the web site operator, again. This shortens the accessing time the internet user spends by eliminating repetitive manual entry of the OPS user information each time the web site is accessed. Disadvantageously, the actual identity of the user is also collected and the user information that is collected is limited to how much the of the OPS information the internet user divulges in creating the OPS profile. This information in the OPS profile is static unless the user wishes to update it.

Another method of collecting information by the web site operator is to implant "cookies" into the computer of the internet user. A cookie is a short segment of code that a web site operator downloads through the internet into the computer program memory of the internet user. The cookie gathers and stores information about the user at a memory location of the computer of the user controlled by the cookie. Each time a particular web site is accessed, the web site operator is capable of scanning the computer of the internet user to activate the cookie and retrieve the information gathered and stored by the cookie. This automatically gathered information about the user is retrieved by means of the cookie manipulating the user computer to send the gathered information to the operating computer of the web site operator through the internet.

These cookies are capable of automatically informing the web site operator of the web sites visited, the items purchased via electronic commerce, the chat rooms and news groups visited and other like information that the cookie is programmed to gather and have stored for access by the web site operator. This information gathering is dynamic and does not require the user to manually enter any of the information gathered.

Thus, cookies are capable of developing similar information about the internet user as discussed above. The disadvantage with cookies is privacy. A cookie is placed automatically on the computer of the user to track information about the user. When the user accesses a particular site, the web site operator either plants a cookie onto the computer if there is not already one present, or retrieves the information collected from a previously implanted cookie.

In addition to the OPS system discussed above, there are other systems that enable anonymous browsing of the web including the Lucent Personalized Web Browser, or LPWA, the AT&T Crowds browser, the Anonymizer browser, the WWW Junk Buster browser and the Trust e browser. There are also other systems which filter cookies or remove the cookies already entered into the computer of the user to prevent the automatic transmission of user information associated the actual identity of the user. These include Luckman's Anonymous Cookie, the WWW Junk Buster and a plurality of other good privacy encryption software, or pretty good privacy (PGP). A comparison of their various features is illustrated in the following chart.

| Capability/Feature | LPWA | AT & T Crowds | Anonymizer | Luckman's Anonymous Cookie | PGP Cookie Cutter | www.junk buster | OPS | TRUSTe |
|---|---|---|---|---|---|---|---|---|
| Browse the web anonymously | ● | ● | ● | ○ | ○ | ● | ● | ○ |
| Establish accts using pseudonyms | ● | ○ | ○ | ○ | ○ | ○ | ○ | ○ |
| Mark websites according to privacy practices | ○ | ○ | ○ | ○ | ○ | ○ | ○ | ● |
| Negotiate how much info to provide | ○ | ○ | ○ | ○ | ○ | ○ | ● | ○ |
| Cookie Filtering | ○ | ○ | ● | ● | ● | ● | ○ | ○ |
| Prevent access to cookie files | ○ | ○ | ● | ● | ● | ● | ○ | ○ |

-continued

| Capability/Feature | LPWA | AT & T Crowds | Anonymizer | Luckman's Anonymous Cookie | PGP Cookie Cutter | www.junkbuster | OPS | TRUSTe |
|---|---|---|---|---|---|---|---|---|
| Private Cookies | ● | ○ | ○ | ○ | ○ | ○ | ○ | ○ |
| Register for/Re-enter websites w/o typing account info | ● | ○ | ○ | ○ | ○ | ○ | ● | ○ |
| No need to keep records of passwords | ● | ○ | ○ | ○ | ○ | ○ | ○ | ○ |
| Filter spam mail | ● | ○ | ○ | ○ | ○ | ○ | ○ | ○ |
| Send e-mail using untraceable alias | ○ | ○ | ○ | ○ | ○ | ○ | ○ | ○ |
| Receive email sent to untraceable alias handle | ● | ○ | ○ | ○ | ○ | ○ | ○ | |
| Post to NetNews Groups using untraceable alias | ◐ | ○ | ○ | ○ | ○ | ○ | ○ | ○ |
| Secure e-commerce transactions | ○ | ◐ | ◐ | ◐ | ◐ | ◐ | ◐ | ◐ |

Disadvantageously, these system all lack a proper balance between the desire of a web site operator to collect meaningful information and the willingness of a web site user to provide the information to a web site operator and the privacy of an internet user. If the privacy consideration is satisfied, then the internet user will be more apt to divulge valuable information to the web site operator.

SUMMARY OF THE INVENTION

In accordance with the present invention, the disadvantageous lack of balance between privacy and user information collection are substantially overcome by automatically creating an alias identification for the user that is provided to the web site operator in lieu of the actual identity of the user and in association with demographic and other non-identifying information concerning the actual user.

Cookies are more tolerable if the information is voluntarily provided by the user with an alias identity The web page operator is able to obtain the demographic information desired, and the user is able to maintain privacy.

In accordance with one aspect of the invention, the alias identity is not stored anywhere. Instead, each time an identity is to be provided from the computer of the user, an alias identity is automatically generated by means of an encryption process performed at the computer of the user.

In accordance with another aspect of the invention, the encryption process by which the alias identity is generated operates in part based on the actual user identity.

Another feature of the invention is that the same alias identity is automatically generated each time there is a command received to do so to enable the web page operator to automatically ascertain multiple "hits" on the web page by the same user without revealing to the web page operator the actual identity of user.

The alias user identity is automatically generated upon generation of a command to do so. In the case of manual operation, the command is given by key stroke. In the case of a cookie, the command is generated automatically when the user accesses an associated web page.

Specifically, the invention is achieved by communicating computer web site user information from one user computer or a remote (computer) on which the user has stored information to an internet web site by automatically creating an alias or an encrypted identification of a user and automatically enabling a web site operating computer to dynamically access the user information together with only the user's alias identification while the user is connected with a web site.

The invention is also achieved by communicating computer internet web site user information from a user computer to an internet web site by creating a user data record profile, encrypting the user data record profile to create an encrypted data record profile, dynamically generating an alias user identification, linking the dynamically generated alias user identification with the encrypted data record profile to create a user information record, and transmitting the user information record to a web site in response to a request for the information record. Preferably, the user information record is transmitted to the web site in response to one of a user command and web site access via one of HTTP and XML.

BRIEF DESCRIPTION OF THE DRAWINGS

The foregoing advantageous features will be described in detail and other advantageous features will be made apparent from the following detailed description of one embodiment of the communication system and method of the invention that is given with reference to the several figures of the drawings in which.

DETAILED DESCRIPTION

Figure 1:
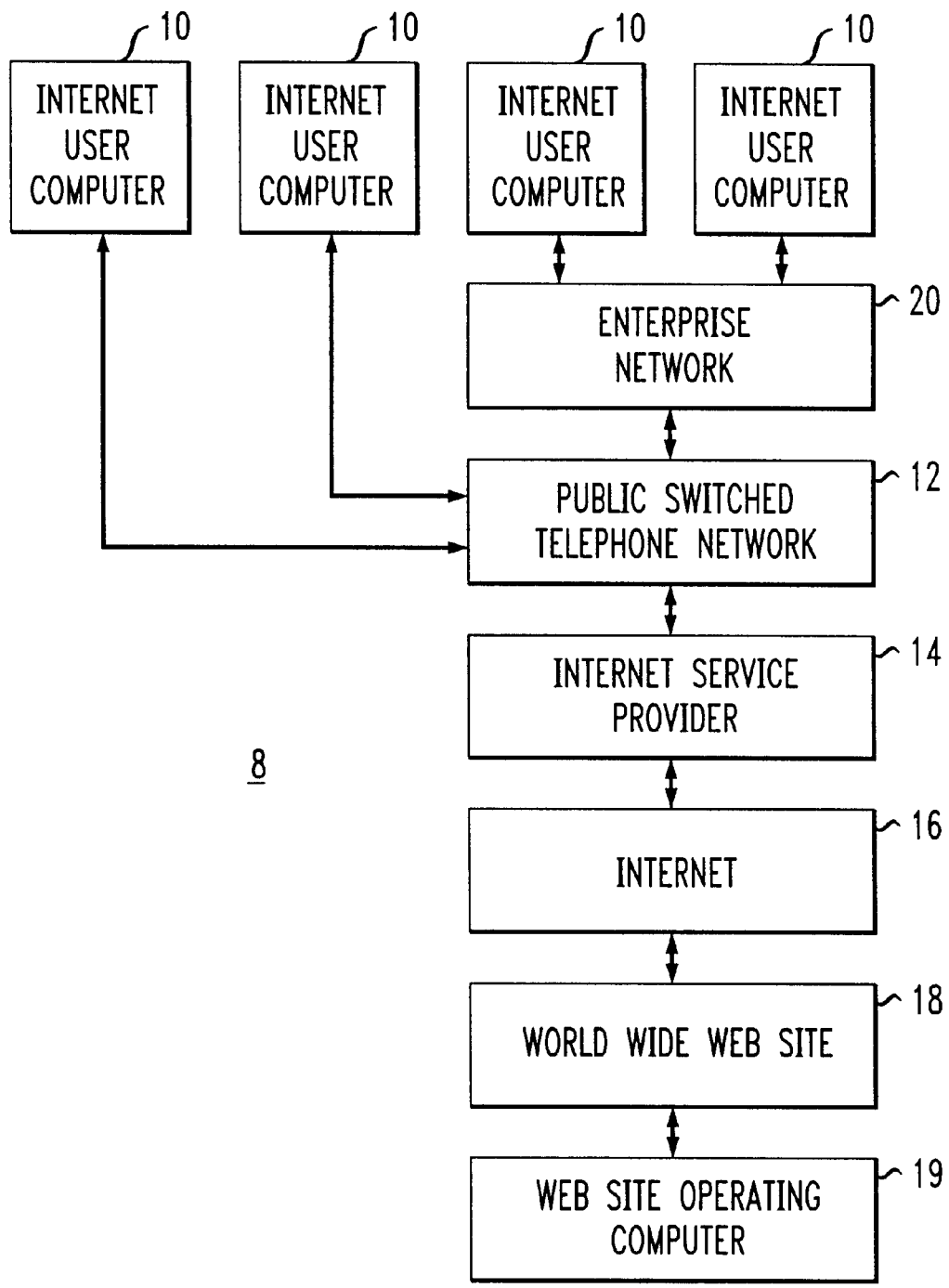
FIG. 1 is a functional block diagram of the communication system in which the communicating method of the present invention is employed.

Referring now to FIG. 1, the internet web site user information communicating method is employed in an internet environment 8 in which it is desired to provide web site user information with respect to at least one of a plurality of user computers an internet user computer 10. The sum of the internet user computers are 10 are connected directly to a public switched telephone network 12, such as a local telephone company. Others are connected to the public switched telephone network 12 through a LAN, or enterprise network.

In any event the internet user computer is connected through the public switched telephone network 12 to an internet service provider 14. The internet service provider provides the internet user computer with access to the world wide computer internet, or internet, 16. Through the internet 16 a data communication link is established with a particular world wide web site, or web site, 18 operated by a web site operating computer 19.

In accordance with the invention the internet user computers 10 are provided with software that enables the performance of the method. In addition, preferably the user computers are provide with internet browser software with a Lucent Personalized Web Assistant as generally described in the web document entitled "The Lucent Personalized Web Assistant" at http://www.bell-labs.com/project/lpwa/system.html#what, dated Jun. 5, 1998, and also in commonly owned pending U.S. patent applications titled "System and Method For Providing Anonymous Personalized Browsing in a Network" by Eran Gabber, Phillip Gibbons, Yossi Matias and Alain Mayer, Ser. No. 08/787,557, filed Jan. 22, 1997, and "System and Method for Providing Anonymous Remailing and Filtering of Electronic Mail" by Eran Gabber, Phillip Gibbons, David M. Kristol, Yossi Matias and Alain Mayer, Ser. No. 09/041,209, filed Mar. 12, 1998, the disclosures of which are hereby incorporated by reference.

Figure 2:
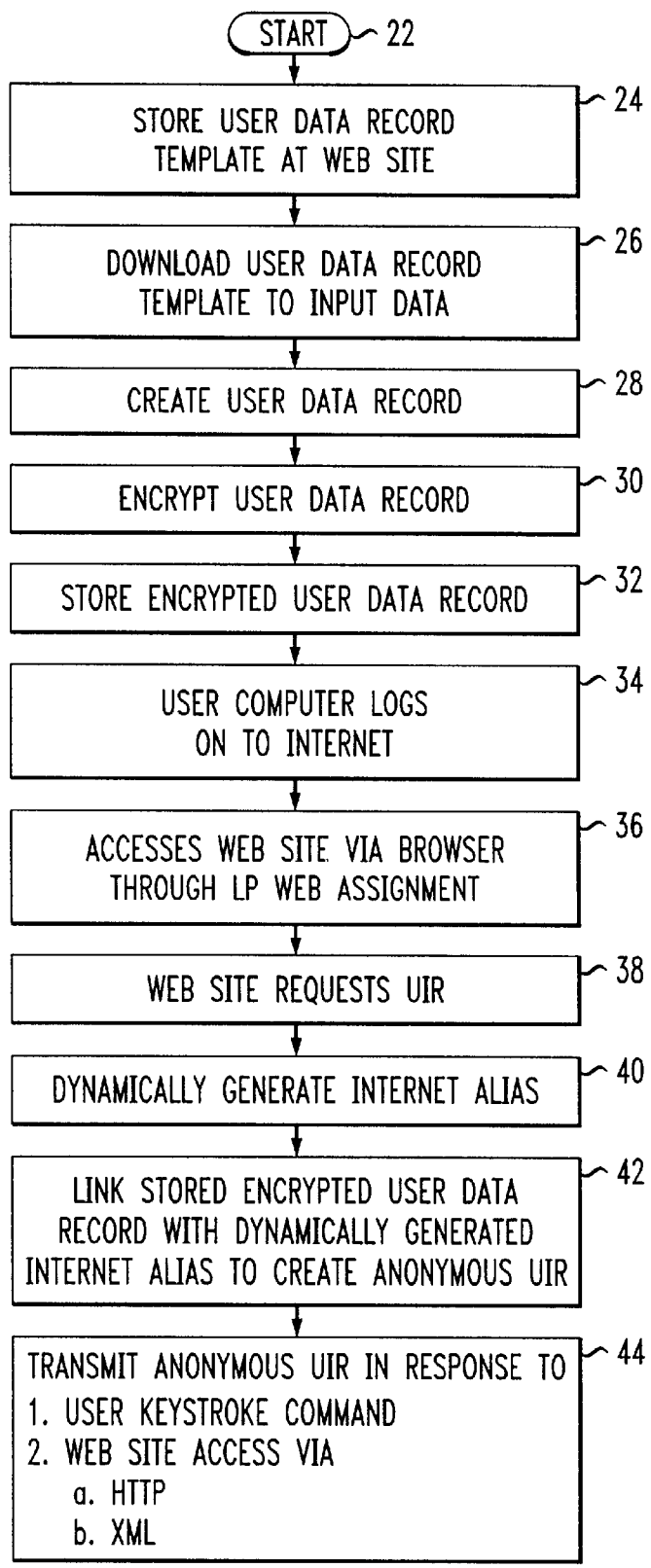
FIG. 2 is a logic flow chart of the preferred method of communicating in accordance with the method of the present invention.

Referring now to FIG. 2, in accordance with the method of the present invention, after the start 22, in step 24 a suitable data record template is installed and stored at a web site 18, FIG. 1, which when actuated interfaces with the users computer and the user. When the internet user computer 10 initially connects with site 18, the data record template software requests user data information. If the user chooses to comply with the request, then action is initiated by the user to download from web site 18, to the user computer 10, a non-encrypted user data record template. In step 26 the user downloads the data record template to the user computer 10 from the web site 18. The user data record template provides a format that facilitates the user inputting by means of on-line keystrokes user data record information requested on the template. Such user data record information includes, but not limited to, demographic information.

In step 28, the user inputs the requested user data record information at the user computer 10 and thereby creates a user data record profile, or UDR. In step 30, the UDR is stored in an unencrypted state. The UDR is preferably stored at the user computer 10. Alternatively, the UDR is e-mailed or downloaded to a remote site, or network server, such as internet service provider 18 of the user computer, for encryption and concatenation as explained in more detail below.

At step 30, the UDR is encrypted, and in step 32 the encrypted user data record is stored. Preferably, the encrypted UDR is stored at the user computer 10. Alternatively, the encrypted UDR is stored at a remote server of the user as noted above.

Subsequently, the user computer logs on to the internet in step 34, and then in step 36 a web site 18 is accessed via an internet browser through a web assistant application, preferably the Lucent Personalized Web Assistant, as described in the two patent applications previously incorporated by reference herein.

At step 40, an alias identification 36 is created in part by encrypting the user information such as, login, e-mail address or password. The alias identification 36 contains information such as, but not limited to, an alias name, an alias password, and an alias email address. The step 32 of encrypting the user data record profile 28 is done either at the local Internet user computer 10 or at a remote location such as at the enterprise network 20 server.

At step 38, the web site 18 requests the user information record, or UIR. In response to this request, in step 40 the web assistant automatically and dynamically generates an alias identification, or user alias 34. This user alias is then automatically linked, or concatenated, with the encrypted user data record wot create the anonymous UIR in step 42. Then in step 44 the user computer transmits the anonymous UIR with the concatenated user alias in response to a key stroke command from the user. Alternatively, the UIR is transmitted automatically in response to web site access via HTTP or XML.

This linkage associates a particular user data record with its associated user alias. Preferably, in the case of the UIR being stored at the user computer 10, the dynamic generation of the user alias is also performed at the user computer 10. In the case of the encrypted UDR being stored at the internet server 14 of the user, the dynamic generation of the user alias and the linkage of the dynamically generated alias with the encrypted user data record is performed at the server 18.

In accordance with the principles of the invention, the dynamic generation of the user alias is generated automatically each time the internet user the UIR is transmitted and is not stored. However, the user alias is generated based upon the real user identify and thus each time the user alias is generated it is the same user identity. Thus, when the same internet web site 18 is revisited by the same internet user, the same user alias is linked to the UIR. In this way the web site is able to monitor for repeat "hits" from the same user even though the real identity of the user is neither revealed nor stored in association with the alias and cannot be discovered. Once the user data record is stored, retransmission to different web sites and multiple transmissions to the same web site is enabled without further user input by the user.

Because the identity of the internet user is not stored it cannot be accessed by the web site operating computer of the web site 18. Rather, only the encrypted information and the alias is accessible, since there is no permanent link between the user alias and the real identity of the user.

Figure 3:
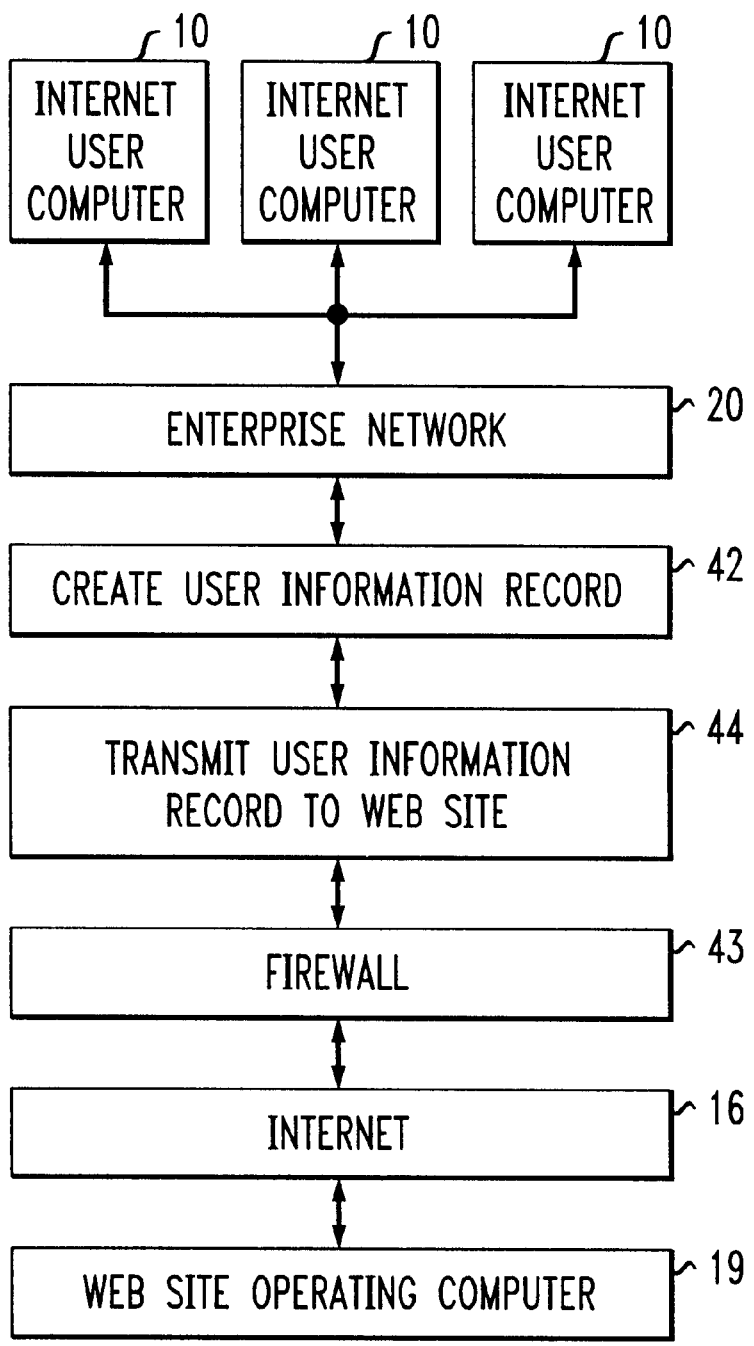
FIG. 3 is a functional block diagram of another embodiment of the communicating system of the present invention.

With reference to FIG. 3, in another embodiment of the invention, privacy is increased by performing the encryption process and alias linkage behind a firewall 43. In this manner, the internet browsing computers and servers of the enterprise network 20 are placed behind the firewall 43 and operate together on a relatively secure intranet. However, once the user information record is created, it is sent through the firewall 43 to the internet 16 and particularly, to the web site operating computer 19 requesting the information. Thus, the identity of the user is hidden, since the TCP or TCP/IP connection is between the web site 18 and the firewall 43. Any attempt by the internet operating computer 19 to connect to the individual computer of the user is blocked by the firewall 43.

While the above embodiment has been disclosed in detail for the purposes of illustrating the invention, the scope of the invention is not limited to such details but rather is defined by the appended claims.

What is claimed is:

1. A method of communication computer Internet web site user information from a user computer to an Internet web site, comprising the steps of:

automatically creating an encrypted identification of a user;

automatically enabling a web site operation computer to dynamically access the user information together with only the encrypted user identification while the user is connected with a web site; and establishing inaccessibility of an Identity of the user by the web operating computer of the web site.

2. The method of claim 1 in which the step of creating is performed by creating an alias identification.

3. The method of claim 2 in which the alias identification includes at least one of an alias name, an alias password and an alias electronic mail address.

4. The method of claim 3 in which the alias identification includes the alias name and the alias electronic mail address.

5. The method of claim 1 in which the alias identification includes at least one of an alias name, an alias password and an alias electronic mail address.

6. The method of claim 1 in which the step of encrypting is performed at an internet server remote from the user.

7. The method of claim 1 in which the step of creating includes the step of automatically, dynamically creating an alias user identification without storage of the alias created.

8. The method of claim 1 in which the step of encrypting is performed at a computer of the user.

9. The method of claim 1 in which the step of enabling includes the step of automatically providing access to the web site operating computer when the user is connected with the web site.

10. The method of claim 1 in which the step of enabling includes the step of providing access to the web site operating computer in response to entry of a command from the user.

11. The method of claim 1 in which the step of enabling includes the step of storing the user information at one of a computer of the user and a computer of a network server of the user.

12. The method of claim 1 in which the step of enabling includes the step of concatenating the encrypted identification with the user information prior to providing access to the user information.

13. The method of claim 12 in which the step of concatenating is performed at one of a computer of the user and an operating computer of a network server of the user.

14. The method of claim 13 in which the step of concatenating is performed automatically by the computer of the user.

15. The method of claim 1 in which the step of enabling includes the step of downloading from the web site a user document record template to a computer of the user.

16. The method of claim 1 including the step of storing the user information in association with a template.

17. The method of claim 1 in which the step of enabling includes the steps of:

storing the user information remote from the web site, automatically linking the user information that is stored with the encrypted identification, and transmitting the user information stored remote from the web site to the web site while linked with the encrypted identification in lieu of being linked with an actual identification of the user.

18. The method of claim 17 in which the step of creating an encrypted identification includes the step of dynamically generating an alias identification.

19. A method of communication computer Internet web site user information from a user computer to an internet web A method site, comprising the steps of:

creating a user data record profile;

encrypting the user data record profile to create an encrypted data record profile to create a user information record;

establishing inaccessibility of an identity of a user by the web operating of the web site;

dynamically generating an alias user identification;

linking the dynamically generated alias user identification with the encrypted data record profile to create a user information record; and transmitting the user information record to a web site in response to a request for the information.

20. The communicating method of claim 19 in which the user information record is transmitted to the web site in response to one of a user command and web site access via an internet protocol.

21. The communicating method of claim 19 in which the user information record is transmitted to the web site in response to one of a user command and web site access via one of HTTP and XML.

22. A method of communicating computer internet web site user information from a user computer to an internet web site, comprising the steps of:

automatically creating an identification of a user; and automatically enabling a web site operating computer to dynamically access the user information together with only the user identification while the user is connected with a web site.

23. The method of claim 22 in which the step of creating is performed by creating an alias identification.

24. The method of claim 23 in which the step of encrypting is performed at an internet server remote from the user.

25. The method of claim 23 in which the step of creating includes the step of automatically, dynamically creating an alias user identification without storage of the alias created.

* * * * *